United States Patent Office
3,538,549
Patented Nov. 10, 1970

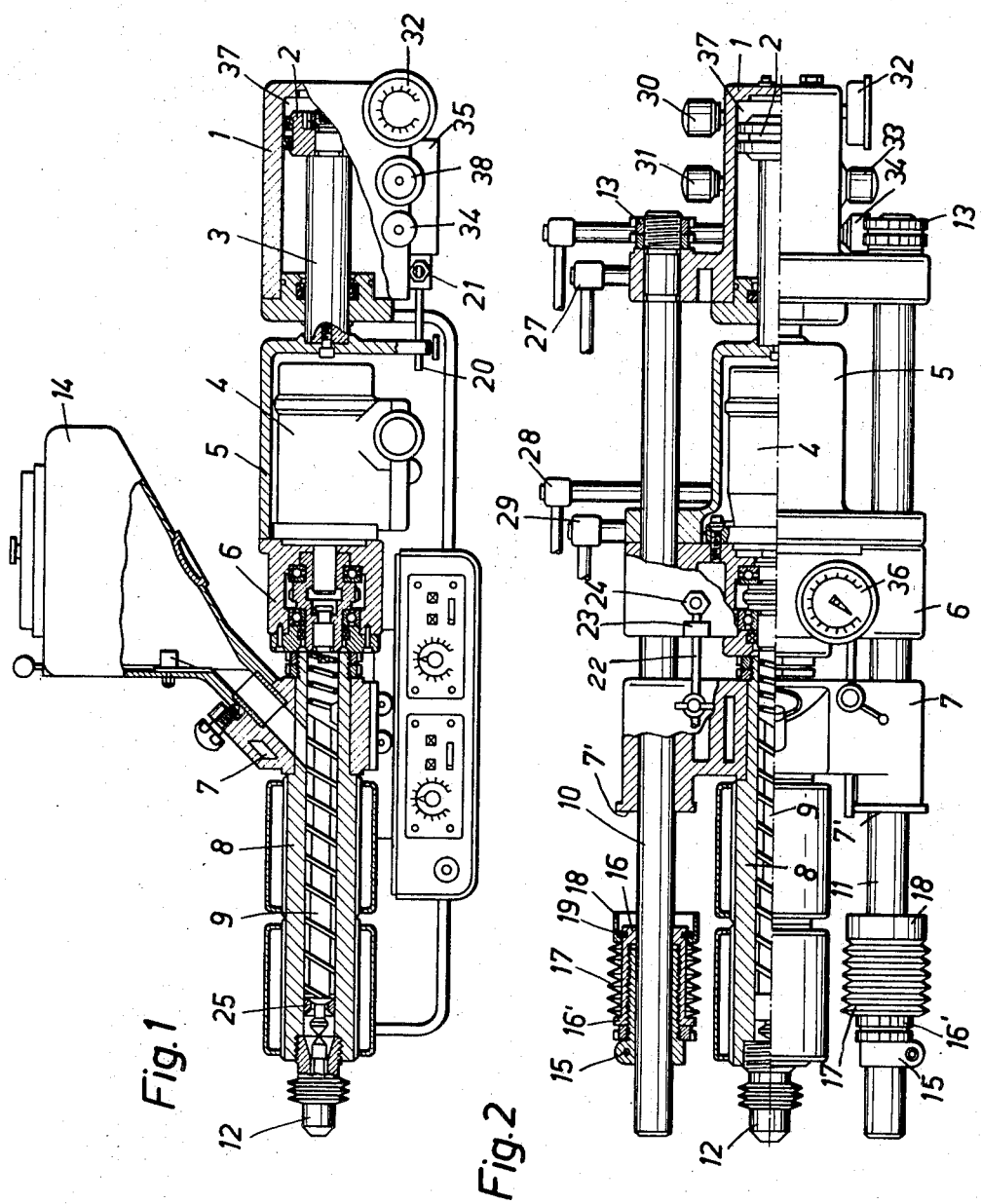

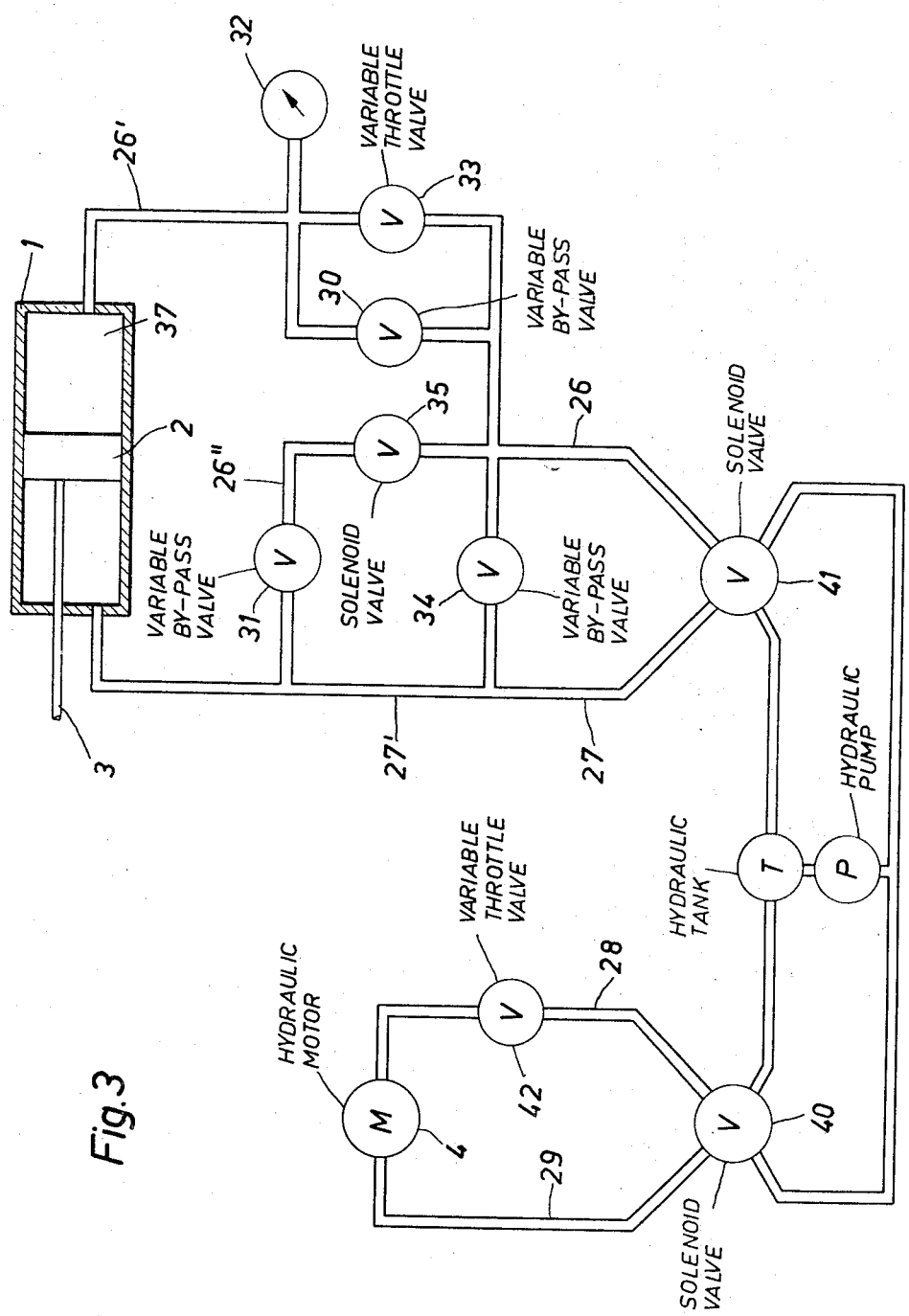

3,538,549
PLASTICIZING UNIT FOR INJECTION-MOLDING MACHINE
Karl Hehl, Lossburg, Wurttemberg, Germany, assignor to Arburg Maschinenfabrik Hehl & Sonne, Lossburg, Wurttemberg, Germany
Filed Apr. 10, 1967, Ser. No. 629,655
Claims priority, application Germany, Apr. 9, 1966, A 52,129
Int. Cl. B29f 1/06
U.S. Cl. 18—30      10 Claims

ABSTRACT OF THE DISCLOSURE

A plasticizing unit including an axially moveable extruction cylinder for receiving plastic material and injecting the plastic material into a mold, a rotatable and axially moveable feed screw within the plasticizing cylinder for driving the plastic material toward the outlet end of the plasticizing cylinder, axial drive means for axially moving the feed screw and plasticizing cylinder to an injection position at which plastic material can be injected into a mold, and spring means positioned for engagement with the plasticizing cylinder to be compressed by the movement thereof toward the injection position and thereby to develop a force urging the plasticizing cylinder away from its injection position so that the plasticizing cylinder will be automatically moved away from its injection position when the force applied to the plasticizing cylinder by the axial drive means is released.

BACKGROUND OF THE INVENTION

The present invention relates to a plasticizing unit in an injection-molding machine for thermoplastic materials in which the plasticizing material is collected under a pressure head in an axially displaceable plasticizing cylinder by means of a rotating feed screw, and is then injected into a mold by means of an axial injection stroke applied to the feed screw by an axial drive piston. Prior art plasticizing units of this general type are disclosed, for example, in FIGS. 10 and 11 of my copending application Ser. No. 327,584, which was filed on Nov. 29, 1963, for a Molding Method and Apparatus, and which has now matured to Pat. No. 3,351,980.

The object of this invention is to provide a plasticizing unit of the above-noted type which is simpler in structure than those heretofore known in the art and which is capable of completing an injection cycle more gently and in a shorter time period than has heretofore been possible.

SUMMARY OF THE INVENTION

In accordance with this invention, the above-noted object is achieved by means of spring members forming an abutment for the plasticizing cylinder, the spring members being compressed by the axial movement of the plasticizing cylinder toward its injection position so as to automatically lift the plasticizing cylinder off the mold at the completion of an injection stroke. The spring members are preferably constructed as spring loaded abutments which terminate the axial movement of the plasticizing cylinder after the sliding nozzle thereof has abutted against the mold and before the sliding nozzle is subjected to the injection stroke.

The pressure head developed in the plastic material by the rotating feed screw during the preplasticization period is produced by throttling the axial drive piston during the return stroke which follows the injection stroke.

BRIEF DESCRIPTION OF THE DRAWINGS

FIG. 1 is a partial vertical cross-sectional view of one illustrative plasticizing unit of this invention.
FIG. 2 is a partial horizontal cross-sectional view of the plasticizing unit shown in FIG. 1.
FIG. 3 is a schematic representation of the hydraulic fluid circulation path for the plasticizing unit shown in FIGS. 1 and 2.

DESCRIPTION OF THE PREFERRED EMBODIMENTS

Figure 4:
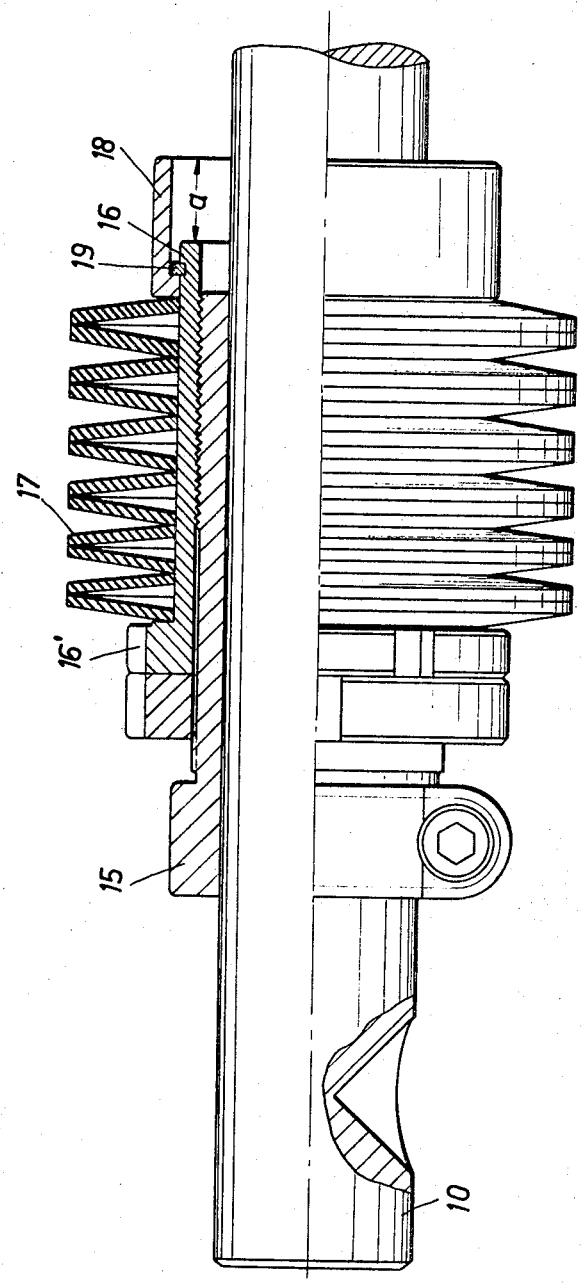
FIG. 4 is an enlarged view of the spring loaded abutments shown in FIGS. 1 and 2.

Referring to FIGS. 1 and 2, a stationary cylinder 1 containing a piston 2 is mounted on supporting struts 10 and 11 by means of nuts 13. A hydraulic motor 4, feed screw 9, and bridge 6 together form a structural unit which is displaceably mounted for axial movement on the struts 10 and 11. The structural unit 4, 6, 9 is coupled to piston 2 by a piston rod 3 via a coupling member 5. A further structural unit, consisting of a plasticizing cylinder 8, a container 14 for granulated plastic material, and a support bridge 7, is also displaceably mounted for axial movement on the struts 10 and 11 in the direction of plasticizing, which is toward the left in FIGS. 1 and 2.

An inner spring retainer sleeve 15 having external threads is clamped to the front end of each strut 10 and 11, respectively. An outer spring retainer sleeve 16 having internal threads is adjustably connected to sleeve 15 by means of the screw threads. Sleeve 16 contains a cup spring packet 17 which is restricted on the one side by a flange 16' of sleeve 16 and on the other side by a sleeve-type end collar 18. End collar 18 is slidable over the surface of sleeve 16 up to an end abutment defined by a retainer ring 19.

In the coupling member 5, a switching rod 20 is mounted to be axially adjustably parallel to the plasticizing direction. The rod 20 engages a switch housing mounted on cylinder 1 of the piston unit, and the actuating roller of a microswitch 21 is disposed in the path of motion of the switching rod 20. This microswitch 21, as will be explained below, drops the driving pressure in the piston unit to a lower level (postpressure stage) after completion of the injection stroke of the piston unit.

A further switching rod 22 is disposed in support bridge 7 parallel to the plasticizing direction. Switching rod 22 is also axially adjustable and engages a conduit 23 in bridge 6. In its path of motion, there is the actuating roller of a microswitch 24 which switches a control valve 40 for the hydraulic motor 4.

In this embodiment, the plasticizing cylinder 8 is provided with a nozzle-type lock 12 which is opened during movement over the mold because of the axial displacement of its sliding nozzle against the action of the cup springs shown thereon and which is closed again upon lift-off under influence of the cup springs. A lock 25 in the plasticizing cylinder assures that at the end of the injection stroke no plastic material will flow back into the plasticizing cylinder.

The above-described plasticizing unit operates as follows:

Upon rotation of the feed screw 9 by the hydraulic motor 4, the granulated plastic material moves from the container 14 into the plasticizing cylinder 8 and is there plasticized by heat from the hollow heating jackets shown as surrounding plasticizing cylinder 8. The material reaches the end of screw 9 in plasticized state where it continues to accumulate as long as screw 9 is rotated by motor 4. Since the plasticizing cylinder 8 abuts with its frontal faces 7' against the spring loaded abutment devices 15–18, whose construction will be explained below, the pressure head developed in the plastic material moves the feed screw 9 backwards along with the bridge 6, the hydraulic motor 4, the coupling member 5, as well as the piston rod 3 and piston 2. A throttling valve 30 in conduit 26', however, places an adjustable resistance against the flow of hydraulic fluid which is pushed out of the compression chamber 37 of cylinder 1 with the return stroke of piston 2. It is thus possible, with the aid of the throttling valve 30, to regulate at will the pressure head of the plastic material within the plasticizing cylinder during the preplasticization period.

During the backward movement of the feed screw 9, the support bridge 6 moves more and more away from the support bridge 7 so that the switching rod 22 finally releases the actuating roller of the microswitch 24 in the bridge 6, whereby control valve 40 interrupts the influx of hydraulic fluid into hydraulic motor 4, thus ending the rotation of feed screw 9 and terminating the preplasticization portion of the operating cycle. At this point, the plasticizing cylinder contains enough plastic material to fill one mold by injecton.

During the above-described preplasticization period, the nozzle lock 12 of the plasticizing cylinder 8 is separated from the mold by a distance approximately equal to the amplitude of movement of its sliding nozzle, thus assuring that no conduction of heat occurs from the plasticizing cylinder to the mold during the preplasticization period.

At this point it should be noted that the plasticizing cylinder 8 in FIGS. 1 and 2 does not contain any preplasticized material. Therefore, the frontal faces 7' of the bridge 7 are disposed at a relatively large distance from the end collar 18 of the cup spring packet 17 instead of abutting thereagainst as described above. The position of the plasticizing cylinder shown in FIGS. 1 and 2 does not occur during a normal plasticizing process, since at the beginning of the injection stroke the screw 9, bridge 6, coupling member 5 and piston 2 are in the position shown in the figures, but the plasticizing cylinder 8 is in a position where the frontal faces 7' of the bridge 7 abut against the end collar 18 of the cup spring packets 17. Accordingly, the distance between the nozzle lock and the mold when the plasticizing unit is lifted off can be varied by screwing the outer spring retainer sleeve 16 more or less deeply into the inner spring retainer sleeve 15.

In the schematic representation of the hydraulic fluid circulating paths shown in FIG. 3, all of the electromagnetic control valves are in a de-energized state, i.e., in center position. The injection stroke is initiated by actuating the control valve 41 by means of a control pulse to couple the output of pump P to conduit 26. The hydraulic fluid then moves from pump P through a throttle valve 33, with which the injection speed is regulated, into the compression chamber 37 of cylinder 1 of the piston unit 1, 2. The driving pressure on piston 2 is determined in part by a by-pass valve 34 through which, depending on its setting, a more or less large amount of the circulating hydraulic fluid returns through conduit 27 and control valve 41 into tank T. The piston 2 is thus driven by the hydraulic fluid and pushes the structural unit consisting of the inactive hydraulic motor 4, the coupling member 5, the support bridge 6, and the feed screw 9 in an axial injection stroke toward the mold. The feed screw 9 thus exerts pressure upon the plastic material stored in the plasticizing cylinder in front of the screw. For this reason, the plasticizing cylinder 8 is brought over the mold during the very first portion of the plasticizing stroke, which can be about 15 to 20 mm. in length, because the plastic mass accumulated in plasticizing cylinder 8 in front of feed screw 9 thansfers the axial pressure of the feed screw 9 to the extrusion cylinder 8. The plasticizing cylinder then moves over the mold against the resistance of the cup spring packets 17, which are thus compressed by the frontal faces 7' of the bridge 7 of the plasticizing cylinder. The distance $a$ traversed by the plasticizing cylinder (FIG. 4) during the first portion of the injection stroke is completed when the frontal faces 7' abut against the opposing surfaces of the outer spring retainer sleeves 16. This occurs when the sliding nozzle of the nozzle lock 12 is pressed into its open position. The sliding nozzle is therefore not subjected to all of the axial pressure of the injection stroke, because the axial movement of the plasticizing cylinder 8 is retarded in due time by the end collars 18 and is subsequently terminated by the abutting surfaces of the outer spring retainer sleeves 16. Thus, the nozzle lock 12 is never subjected to the full axial thrust of an injection stroke when it hits the mold. The nozzle lock, and to a certain extent also the mold and the plasticizing cylinder, are therefore exposed to comparatively low mechanical stresses so that premature wear of exposed machine components is prevented.

After the nozzle lock is opened, the plastic material previously accumulated in front of feed screw 9 is injected into the mold at high speed due to the continued axial movement of the feed screw and the structural elements attached thereto. At the end of the injection stroke, the switching rod 20 releases the actuating roller of the microswitch 21, whose control pulse actuates the control valve 35 (FIG. 3). This opens the path 26" to the by-pass valve 31, which, depending on its setting, permits a more or less large amount of the hydraulic fluid to return to tank T via conduit 27'. Therefore, upon release of the actuating roller of the microswitch 21, the pressure in the compression chamber 37 is reduced to a lower level, which is called the postpressure stage. The postpressure stage begins when the actual injection process is completed and when it is necessary to maintain the plasticizing cylinder close to the mold for a certain period of time under a limited axial pressure.

At the end of the injection process, the actuating roller of the microswitch 24 abuts against the switching rod 22 and thus closes a circuit for the control valve 40 of hydraulic motor 4. Control valve 40 is actuated at the proper time at the end of the postpressure stage by a control pulse of the control program so that hydraulic fluid is moved from the pump P via conduit 28 and via a throttle valve 42 to the hydraulic motor 4 from where it returns to the tank T via conduit 29. Simultaneously with the beginning of rotation of the hydraulic motor 4, or shortly before, the control valve 41 is brought into center position by a control pulse from the control program thus terminating the postpressure stage. This causes the compressed cup springs 17 to expand and to lift the plasticizing cylinder away from the mold at least over the distance $a$. During this lift-off, the nozzle 12 closes. The plasticizing cylinder is then thermally separated from the mold, and the above-described preplasticization cycle is then repeated.

Acceleration of the plasticizing process is achieved in this invention because directly after completion of the injection, i.e., upon completion of the postpressure stage, preplasticization can begin without the necessity of removing the cylinder 1 from the mold by a special return stroke of the piston unit 1, 2. This is due to the fact that at the very moment when the postpressure stage is completed, i.e., when the axial pressure on the feed screw is released, and when the feed screw begins to rotate for the purpose of preplasticization, the plasticizing cylinder is automatically lifted off the mold by the expansion of the cup spring packet 17 without requiring any appreciable amount of time.

It will be understood that the above description of the present invention is susceptible to various modifications, changes, and adaptations, and the same are intended to be comprehended within the meaning and range of equivalents of the appended claims.

What is claimed is:

1. In an injection molding machine for injecting material into a mold, an improved plasticizing unit comprising, in combination:
 (a) axially moveable plasticizing cylinder means for receiving plastic material and for injecting such plastic material into a mold, said plasticizing cylinder means having an outlet at one end thereof:
 (b) a rotatable and axially moveable feed screw within the plasticizing cylinder means for driving such plastic material toward the outlet end of said plasticizing cylinder means;
 (c) axial drive means coupled to said feed screw for axially moving said feed screw and said plasticizing cylinder means to an injection position at which plastic material can be injected therefrom into a mold; said axial drive means comprises a hydraulically driven piston coupled to said feed screw, and further comprising means for throttling said piston during its return stroke to retard the backward movement of said feed screw and thereby to build up a pressure head in the plastic material within said plasticizing cylinder means; and
 (d) spring means positioned for engagement with said plasticizing means to be compressed by the axial movement thereof toward said injection position and thereby to develop a force urging said plasticizing cylinder means away from its injection position, whereby said plasticizing cylinder means will be automatically moved away from its injection position when the force applied to said plasticizing cylinder means by said axial drive means is released, said plasticizing cylinder means being mounted for sliding movement on a support means and said spring means including a spring, one end of which is immovably connected to said support means and the other end of which is between said one spring and and said plasticizing cylinder means and is in the path of movement thereof; said spring means including abutment means fixed to said support means for limiting the axial movement of said plasticizing cylinder means after said spring has undergone a predetermined amount of deflection.

2. A plasticizing unit as defined in claim 1, wherein said abutment means for limiting the axial movement of said plasticizing cylinder means are positioned to define said injection position of said plasticizing cylinder means.

3. In an injection molding machine for injecting material into a mold, an improved plasticizing unit comprising, in combination:
 (a) axially moveable plasticizing cylinder means for receiving plastic material and for injecting such plastic material into a mold, said plasticizing cylinder means having an outlet at one end thereof;
 (b) a rotatable and axially moveable feed screw within the plasticizing cylinder means for driving such plastic material toward the outlet end of said plasticizing cylinder means;
 (c) axial drive means coupled to said feed screw for axially moving said feed screw and said plasticizing cylinder means to an injection position at which plastic material can be injected therefrom into a mold; said axial drive means comprises a hydraulically driven piston coupled to said feed screw, and further comprising means for throttling said piston during its return stroke to retard the backward movement of said feed screw and thereby to build up a pressure head in the plastic material within said plasticizing cylinder means; and
 (d) spring means positioned for engagement with said plasticizing cylinder means to be compressed by the axial movement thereof toward said injection position and thereby to develop a force urging said plasticizing cylinder means away from its injection position, whereby said plasticizing cylinder means will be automatically moved away from its injection position when the force applied to said plasticizing cylinder means by said axial drive means is released; said spring means include abutment means for limiting the axial movement of said plasticizing cylinder means wherein said plasticizing cylinder means is mounted for sliding movement on at least one supporting member, and wherein said spring means comprises a spring retainer rigidly connected to said supporting member and compression spring means positioned between said plasticizing cylinder means and said spring retainer.

4. A plasticizing unit as defined in claim 3 wherein said spring retainer is adjustably connected to said supporting member, and wherein said plasticizing cylinder means contains an axially moveable nozzle lock at the outlet end thereof, and wherein said spring retainer is positioned on said supporting member so that the axial compression movement of said compression spring means is slightly longer than the axial movement of said nozzle lock.

5. A plasticizing unit as defined in claim 4 wherein said spring retainer is positioned on said supporting member so that said axially moveable nozzle lock will be opened by contact with a mold when the axial movement of said plasticizing cylinder means is limited by said spring retainer, whereby said nozzle lock will be opened by the axial movement of said nozzle lock without being subjected to the full force of said axial drive means.

6. In an injection molding machine for injecting plastic material into a mold, an improved plasticizing unit comprising, in combination:
 (a) axially moveable plasticizing cylinder means for receiving plastic material and for injecting such plastic material into a mold said plasticizing cylinder means having an outlet at one end thereof;
 (b) a rotatable and axially moveable feed screw within the plasticizing cylinder means for driving such plastic material toward the outlet end of said plasticizing cylinder means;
 (c) axial drive means coupled to said feed screw for axially moving said feed screw and said plasticizing cylinder means to an injection position at which plastic material can be injected therefrom into a mold; and
 (d) spring means posiitoned for engagement with said plasticizing cylinder means to be compressed by the axial movement thereof toward said injection position and thereby to develop a force urging said plasticizing cylinder means away from its injection position, whereby said plasticizing cylinder means will be automatically moved away from its injection position when the force applied to said plasticizing cylinder means by said axial drive means is released;
 (e) wherein said plasticizing cylinder means is mounted for sliding movement on at least one supporting member, and wherein said spring means comprises an inner spring retainer sleeve clamped to said supporting member, and outer spring retainer sleeve adjustably connected to said inner spring retainer sleeve by means of screw threads, and a compression spring surrounding said outer spring retainer sleeve and axially moveable with respect to said outer spring retainer sleeve.

7. A plasticizing unit as defined in claim 6 wherein said outer spring retainer sleeve contains a spring supporting flange at one end thereof, one end of said compression spring resting against said spring supporting flange, and an annular end piece slidably mounted on said outer spring retainer sleeve in contact with the other end of said compression spring for transmitting axial compression forces to said spring, whereby the relative position of said inner and outer spring retainer sleeves can be adjusted by rotating said outer spring retainer sleeve.

8. A plasticizing unit as defined in claim 1 and further comprising first microswitch means responsive to the axial movement of said feed screw, and means coupled to said first microswitch means for reducing the driving force of said axial drive means upon completion of an axial injection stroke of said feed screw.

9. A platicizing unit as defined in claim 1 and further comprising second microswitch means responsive to the axial movement of said feed screw, and means coupled to said second microswitch means for initiating an axial injection stroke of said axial drive means when said feed screw reaches a predetermined position with respect to said extrusion cylinder means.

10. A plasticizing unit as defined in claim 1 wherein said plasticizing cylinder means is mounted for sliding movement on at least one supporting member, and wherein said spring means comprises an inner spring retainer sleeve clamped to said supporting member, an outer spring retainer sleeve adjustably connected to said inner spring retainer sleeve by means of screw threads, and a compression spring surrounding said outer spring retainer sleeve and axially movable with respect to said outer spring retainer sleeve.

References Cited

UNITED STATES PATENTS

| | | | |
|---|---|---|---|
| 3,146,287 | 8/1964 | Kleine-Albers | 18—30 X |
| 3,335,457 | 8/1967 | Martin | 18—30 X |

FOREIGN PATENTS

| | | |
|---|---|---|
| 419,000 | 3/1947 | Italy. |

J. SPENCER OVERHOLSER, Primary Examiner

M. O. SUTTON, Assistant Examiner